United States Patent
Ogyu et al.

(10) Patent No.: US 10,099,448 B2
(45) Date of Patent: Oct. 16, 2018

(54) SLIDE FASTENER REINFORCEMENT TAPE (71) Applicant: YKK Corporation, Tokyo (JP)

(72) Inventors: Takayuki Ogyu, Toyama (JP);
Shintaro Ohsugi, Toyama (JP);
Kumiko Oyama, Toyama (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 14/899,156

(22) PCT Filed: Jun. 17, 2013

(86) PCT No.: PCT/JP2013/066608
§ 371 (c)(1),
(2) Date: Dec. 17, 2015

(87) PCT Pub. No.: WO2014/203310
PCT Pub. Date: Dec. 24, 2014

(65) Prior Publication Data
US 2016/0144599 A1    May 26, 2016

(51) Int. Cl.
B32B 7/12 (2006.01)
B32B 27/08 (2006.01)
B32B 27/32 (2006.01)
B32B 27/34 (2006.01)
B32B 27/36 (2006.01)
B32B 27/40 (2006.01)
C09J 7/35 (2018.01)
C09J 7/22 (2018.01)
A44B 19/34 (2006.01)

(52) U.S. Cl.
CPC ............... *B32B 7/12* (2013.01); *B32B 27/08* (2013.01); *B32B 27/32* (2013.01); *B32B 27/34* (2013.01); *B32B 27/36* (2013.01); *B32B 27/40* (2013.01); *C09J 7/22* (2018.01); *C09J 7/35* (2018.01); *A44B 19/34* (2013.01); *B32B 2307/412* (2013.01); *B32B 2405/00* (2013.01); *C09J 2201/36* (2013.01); *C09J 2423/00* (2013.01); *C09J 2423/166* (2013.01); *C09J 2467/00* (2013.01); *C09J 2467/006* (2013.01); *C09J 2475/00* (2013.01); *C09J 2475/006* (2013.01); *C09J 2477/00* (2013.01); *C09J 2477/006* (2013.01)

(58) Field of Classification Search
None
See application file for complete search history.

(56) References Cited

U.S. PATENT DOCUMENTS

| 4,059,715 | A | * | 11/1977 | Pletcher | C08G 63/46 156/235 |
| 4,477,636 | A | * | 10/1984 | Muroi | C08G 63/52 156/332 |
| 4,886,689 | A | * | 12/1989 | Kotliar | B29C 47/06 156/244.27 |
| 5,728,460 | A | | 3/1998 | Hirasawa et al. | |
| 5,985,438 | A | | 11/1999 | Watanabe | |
| 6,093,489 | A | | 7/2000 | Watanabe | |
| 6,224,975 | B1 | * | 5/2001 | Wang | C09J 7/0246 428/192 |
| 6,630,236 | B2 | * | 10/2003 | Watanabe | A44B 19/34 24/433 |
| 2002/0076551 | A1 | | 6/2002 | Watanabe et al. | |
| 2002/0081427 | A1 | * | 6/2002 | Yamakita | A44B 19/34 428/355 AC |
| 2013/0084418 | A1 | * | 4/2013 | Takeda | B32B 7/12 428/41.3 |
| 2015/0044456 | A1 | * | 2/2015 | Chien | C09J 7/0257 428/349 |

FOREIGN PATENT DOCUMENTS

| CA | 2173783 C | * | 12/1998 | ............. A44B 19/34 |
| EP | 0875167 A2 | | 4/1998 | |
| EP | 0875167 A2 | | 11/1998 | |
| JP | 62-149780 A | | 7/1987 | |
| JP | 196211/1988 | | 12/1988 | |
| JP | 8-299033 A | | 11/1996 | |
| JP | 10-243807 A | | 9/1998 | |

(Continued)

OTHER PUBLICATIONS

Alphonsus V. Pocius, "Adhesion and Adhesives Technology An Introduction", 2012, Hanser Publications, 3rd edition, pp. 307-309.*
Toshinobu, Oya, "Transversely Affixed Tape for Zippers", English translation of JP 62149780A, published on Jul. 3, 1987.*
Takeshi, Aritomo, et al., "Zipper for Dying Product Use", English translation of JP 63196211U, published on Dec. 16, 1988.*

(Continued)

Primary Examiner — Anish P Desai
(74) Attorney, Agent, or Firm — Kilpatrick Townsend & Stockton LLP (57) ABSTRACT A slide fastener reinforcement tape is provided that exhibits high performance launderability and peel strength between a reinforcement tape and a fastener tape, in environments harsher than those set forth in the prior art. Specifically, provided is a slide fastener reinforcement tape formed by laminating an adhesive layer on the back surface of a transparent elastomer film, wherein the slide fastener reinforcement tape is characterized in that the adhesive layer is a polyester-based hot-melt adhesive, a two-part type curable adhesive or a polyamide-based hot-melt adhesive, and the melting point of the adhesive layer is higher than 120° C. and no more than 160° C. and the melt viscosity at 200° C. is higher than 2000 poise and no more than 5500 poise.

13 Claims, 3 Drawing Sheets (56) References Cited

FOREIGN PATENT DOCUMENTS

| JP | 10-295418 A | 11/1998 |
| JP | 10-306262 A | 11/1998 |
| JP | 3650732 B2 | 5/2005 |

OTHER PUBLICATIONS

International Preliminary Report on Patentability, PCT Application No. PCT/JP2013/066608, dated Dec. 17, 2015.
International Search Report, PCT Application No. PCT/JP2013/066608, dated Sep. 17, 2013.

* cited by examiner

SLIDE FASTENER REINFORCEMENT TAPE

This application is a national stage application of PCT/JP2013/066608, which is incorporated herein by reference.

FIELD OF THE INVENTION

The present invention relates to a reinforcing tape (reinforcing sheet material) adhered to ends of a fastener tape for attaching a separable fitting.

BACKGROUND OF THE INVENTION

As reinforcing tapes adhered to ends of fastener tapes, there are various types of conventionally known reinforcing tapes. For example, there are known reinforcing tapes that is used by being stacked with transparent synthetic resin films to realize seeing through the color of a dyed fastener tape in order to cut out the need of dyeing into different colors of reinforcing tapes to match with the color of such a dyed fastener tape, and in order to omit the trouble of stock management; and for example, reinforcing tapes as disclosed in patent document 1, obtained as a horizontally pasted reinforcing tape that is formed by stacking transparent polyester copolymer films having a melting point of below 200° C. on one of the surface of a transparent nylon-6 or nylon-66 film in order to make the reinforcing tape visible through the pattern of the base cloth of a fastener tape.

The reinforcing tape containing a two-layer synthetic resin film disclosed in the patent document 1 is hard in material itself, so that it is difficult to be bent to a shape in a manner consistent with the shape of a fastener tape core for attaching metal pieces such as a separable fitting. Therefore, the core of the fastener tape is difficult to be formed into an accurate shape. Furthermore, the following problem exists: the bent portion will be whitened if the reinforcing tape is repeatedly bent, so as to lose its beautiful appearance.

To solve such a problem, as recorded in patent documents 2 and 3, the present applicant developed a reinforcing tape which uses a transparent polyester-based film on a surface layer and is formed by stacking an adhesive layer on a rear surface. In such a reinforcing tape, the surface layer (reinforcing layer) is formed by a polyester-based film, so the reinforcing tape has the following advantages: in comparison to the reinforcing tape formed from a synthetic resin film, this reinforcing tape has flexibility and is easy to be bent to match the shape of a core of a fastener tape, and the like. However, in the case of using a film as a reinforcing layer, there are the following problems when a flexible film with good flexibility and transparency is used: the washing resistance or the resistance to dry cleaning is poor; the reinforcing tape is easy to be swelled if a product equipped with a fastener tape is washed or dry cleaned, so that the peel strength between the reinforcing tape and the fastener tape is reduced and the reinforcing tape is easy to be peeled off.

PRIOR ART DOCUMENTS

Patent Documents

Patent document 1: JPS62-149780A
Patent document 2: JPH08-299033A
Patent document 3: JPH10-306262A
Patent document 4: JP3650732B

SUMMARY OF THE INVENTION

Problem to be Solved by the Present Invention

However, the following reinforcing tapes have been requested recently. These reinforcing tapes have the advantages of maintenance of excellent flexibility and transparency of a film as a reinforcing layer, high peel strength between the reinforcing tapes and the fastener tapes and good washing resistance. However, in the case of using a film as a reinforcing layer, when a flexible film with good flexibility and transparency is used, the washing resistance or the resistance to dry cleaning is poor, so that the reinforcing tape is easy to be swelled after being subjected to washing or dry-cleaning, and therefore the peel strength between the reinforcing tape and the fastener tape is reduced and the reinforcing tape is easy to be peeled off. In contrast, in the case of using a relatively hard film to improve the resistance to dry cleaning or operability and strength, there is the following problem: the reinforcing tape is difficult to be bent in a manner consistent with the shape of a core of the fastener tape due to too high stiffness, and has poor transparency. Therefore, in a real product, a nylon film or a plain woven fiber is used as the reinforcing layer, but the reinforcing tape using a film is difficult to be practical.

To solve this problem, a reinforcing tape for slide fasteners has been recorded in patent document 4, wherein a middle layer thinner than both an elastomer film and an adhesive layer is arranged between the elastomer film and the adhesive layer, and the middle layer is an anchor coating agent.

However, now, a reinforcing tape for slide fasteners which, in spite of being subjected to for example washing by a large commercial washing machine or exposed in more rigorous environments in China such as high-temperature washing with high temperature water, high-temperature drying at a set high drying temperature and ironing process used in the final processing after seaming, may still play high performances is desired. That is, there is need of a reinforcing tape with excellent flexibility and transparency, high level of peel strength between the reinforcing tape and a fastener tape, and high washing resistance, so that this reinforcing tape still has a room for improvement.

Technical Solutions for Solving the Problem

To achieve the above object, the present inventors have concentrated on studies, and have found that a reinforcing tape capable of playing high performances particularly in terms of peel strength between the reinforcing tape and a fastener tape and the washing resistance even in more rigorous environments than ever may be obtained by replacing the adhesive of an adhesive layer forming the reinforcing tape with an adhesive having particular properties, so as to complete the present invention.

In other words, the present invention will be described as below.

(1) A reinforcing tape for slide fasteners, which is formed by stacking an adhesive layer on a rear face of a transparent film, wherein the adhesive layer is polyester-based hot-melt adhesive, polyamide-based hot-melt adhesive, polyolefin-based hot-melt adhesive or polyurethane-based holt-melt adhesive, with a melting point of above 120° C. but 160° C. or less and a melt viscosity at 200° C. of above 2000 poise but 5500 poise or less.

(2) The reinforcing tape for slide fasteners according to (1), further provided with a middle layer located between the film and the adhesive layer and comprising an anchor coating agent.

(3) The reinforcing tape for slide fasteners according to (2), wherein the film is a polyamide-based film, a polyester-based film, a polyolefin-based film or a polyurethane-based film, and the middle layer is two-part type curable adhesive.

(4) The reinforcing tape for slide fasteners according to any one of (1) to (3), wherein the melting point of the adhesive is 130° C. or greater but 150° C. or less, and the melt viscosity at 200° C. is 3000 poise or greater but 5000 poise or less.

(5) The reinforcing tape for slide fasteners according to any one of (1) to (4), wherein the thickness of the film is equal to or less than that of the adhesive layer.

(6) The reinforcing tape for slide fasteners according to (5), wherein the thickness of the film and the thickness of the adhesive layer satisfy the following relationship:

(thickness of the adhesive layer)/(thickness of the film)=1 to 2.

(7) The reinforcing tape for slide fasteners according to (2), wherein the thickness of the middle layer is 0.5 μm to 10 μm.

(8) The reinforcing tape for slide fasteners according to any one of (1) to (7), wherein an overall thickness in the case of being stacked on both sides of a fastener tape is 100 μm to 200 μm, or an overall thickness in the case of being stacked on a single side of the fastener tape is 200 μm to 400 μm.

(9) A reinforcing tape for slide fasteners, which is formed by stacking an adhesive layer on a rear surface of a transparent film, wherein the adhesive layer is polyester-based hot-melt adhesive, polyamide-based hot-melt adhesive, polyolefin-based hot-melt adhesive or polyurethane-based holt-melt adhesive, with a melting point of above 120° C. but 160° C. or less, and the thickness of the film and the thickness of the adhesive layer satisfy the following relationship:

(thickness of the adhesive layer)/(thickness of the film)=1 to 2.

(10) The reinforcing tape for slide fasteners according to (9), wherein a melt viscosity of the adhesive at 200° C. is above 2000 poise but 5500 poise or less.

(11) The reinforcing tape for slide fasteners according to (9) or (10), wherein the reinforcing tape is further provided with a middle layer comprising an anchor coating agent, which is located between the film and the adhesive layer.

(12) The reinforcing tape for slide fasteners according to (11), wherein the film is a polyamide-based film, a polyester-based film, a polyolefin-based film or a polyurethane-based film, and the middle layer is two-part type curable adhesive.

(13) The reinforcing tape for slide fasteners according to any one of (9) to (12), wherein the melting point of the adhesive is 130° C. or greater but 150° C. or less, and the melt viscosity at 200° C. is 3000 poise or greater but 5000 poise or less.

(14) The reinforcing tape for slide fasteners according to (11), wherein the thickness of the middle layer is 0.5 μm to 10 μm.

(15) The reinforcing tape for slide fasteners according to any one of (9) to (14), wherein an overall thickness in the case of being stacked on both sides of a fastener tape is 100 μm to 200 μm, or an overall thickness in the case of being stacked on a single side of the fastener tape is 200 μm to 400 μm.

Effects of the Invention

A reinforcing tape for slide fasteners maybe provided according to the present invention, and the reinforcing tape may play high performances particularly in terms of peel strength between the reinforcing tape and a fastener tape and the washing resistance even in more rigorous environments than ever.

DETAILED DESCRIPTION OF THE EMBODIMENTS

The present invention will be described as below.

Figure 1:
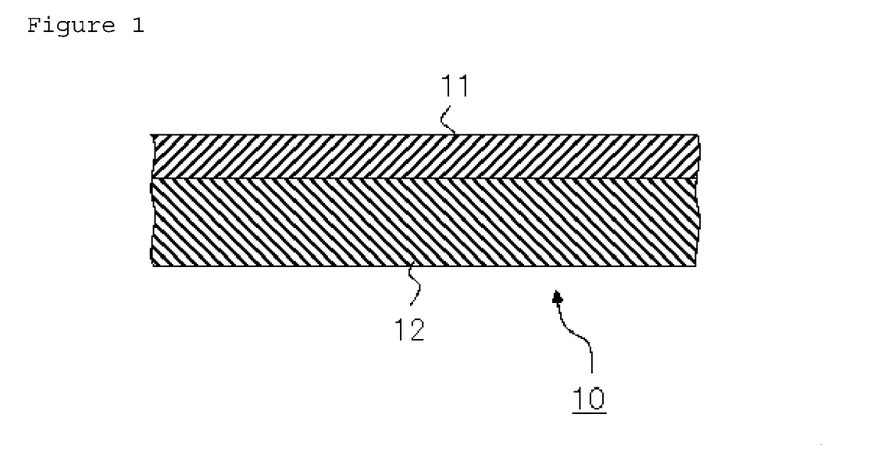
FIG. 1 is a partially cross-sectional view showing an embodiment of a reinforcing tape according to the present invention.

FIG. 1 shows an implementation of a reinforcing tape for slide fasteners according to the present invention in a partially cross-sectional view.

In FIG. 1, the reinforcing tape 10 for slide fasteners provided by the present invention is formed by stacking an adhesive layer 12 on a rear face of a transparent film 11, wherein the adhesive layer is a polyester-based hot-melt adhesive, polyamide-based hot-melt adhesive, polyolefin-based hot-melt adhesive or polyurethane-based holt-melt adhesive.

Such a reinforcing tape not only may be stacked on a single face of a fastener tape, but also may be stacked on both faces of the fastener tape. Generally, the reinforcing tape is stacked on both faces of the fastener tape.

The thickness of the film 11 is preferably that of the adhesive layer or less, that is, (thickness of the adhesive layer)/(thickness of the film) is 1 or more. In addition, as the overall thickness and the thickness of each layer are determined according to the use of the reinforcing tape for fastener tape, the relationship between (thickness of the adhesive layer)/(thickness of the film)=1 to 2 is preferably more satisfied. By setting such a ratio, white turbidity caused by the peeling from the fastener tape may be prevented. On the other hand, the flexibility of the state of being adhered to the fastener tape may be ensured.

Hereby, the thickness of the film 11 is in general properly 30 μm to 120 μm, preferably about 50 μm to 80 μm. On the other hand, the thickness of the adhesive layer 12 is in general properly 50 μm to 200 μm, preferably about 60 μm to 120 μm.

The transparent film 11 properly includes a polyamide-based film, a polyester-based film, a polyolefin-based film or a polyurethane-based film.

For the transparent film 11, it is particularly preferable to employ a film having a flexural modulus of 6,000 kg/cm$^2$ to 9,000 kg/cm$^2$ when the polyamide-based film is used, and a film having a flexural modulus of 3,000 kg/cm$^2$ to 5,000 kg/cm$^2$ when the polyester-based film is used. As a flexural film having a flexural modulus smaller than the above range has few crystal components, it is a trend to have poor resistance to dry cleaning or strength of transverse tension caused by a separable fitting. In addition, when the dry cleaning fluid is slightly muddy; it is easy to be polluted by the dry cleaning fluid. On the other hand, a film having a flexural modulus beyond the above range is likely to result in low transparency or flexibility due to too many crystal components. In the case of using a film having a flexural modulus within the above range as a reinforcing layer, a transparent reinforcing tape for slide fasteners having good washing resistance, resistance to dry cleaning and strength may be obtained.

Furthermore, if the adhesive layer or middle layer of the reinforcing tape has a thickness less than that of the film as the reinforcing layer and a low stiffness, the flexural modulus of the whole reinforcing tape greatly depends on the flexural modulus of the film itself but are affected by the type and thickness of the adhesive layer and the like. c1

Therefore, it is preferable to select the type and thickness of the adhesive layer in a manner that the flexural modulus of the whole reinforcing tape also falls within the above range.

The adhesive of the adhesive layer 12 is preferably hot-melt adhesive easy to be amiable with the material of the fastener tape. Furthermore, in the case of FIG. 1, the film and the fastener tape are of the same material. By arranging a middle layer 23 between the film 21 and the adhesive layer 22 as shown in FIG. 2, the adhesion is also out of question even if the film and the fastener tape are of different materials.

In addition, in view of the resistance to high temperature, particularly, considering that the reinforcing tape is not peeled off with respect of the cleaning and washing by high temperature water and the high temperature drying, the adhesive is preferably an adhesive with a high melting point and a high viscosity, for example, with a melting point of above 120° C. but 160° C. or less and a melt viscosity as measured at 200° C. and at a load of 10 kgf by a flow tester of above 2000 poise but 5500 poise or less. Further, preferably, the melting point is 130° C. or greater but 150° C. or less, and the melt viscosity as measured at 200° C. and at a load of 10 kgf is 3000 poise or greater but 5000 poise or less.

Among these hot-melt adhesives, as disclosed in JPH10-295418, in the case of using a hot-melt adhesive having a melting point of 110-120° C. and a melt viscosity at 200° C. of 1000-2000 poise, the following advantages may be achieved: when the reinforcing tape is heated and pressed onto a fastener tape, the hot-melt adhesive is easy to be melt and permeated between fibers of the fastener tape, and the resin being between the fibers may realize a higher anchoring effect after cooling and curing, so that the high peel strength between the reinforcing tape and the fastener tape may be maintained even after washing or dry cleaning. Therefore, it is particularly preferable.

Figure 2:
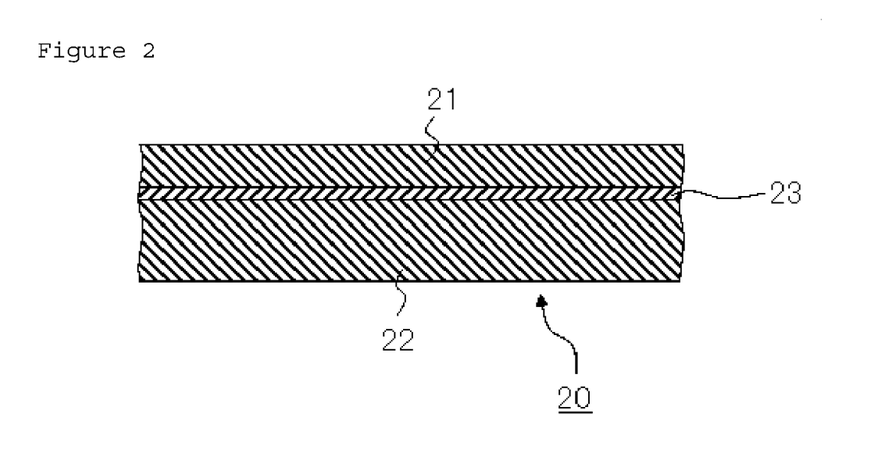
FIG. 2 is a partially cross-sectional view showing another embodiment of the reinforcing tape according to the present invention.

In the present invention, as shown in FIG. 2, it is also possible to further arrange a middle layer 23 in a reinforcing tape 20 for slide fasteners. The middle layer 23 is arranged between the film 21 and the adhesive layer 22, and includes an anchor coating agent.

The thickness of the middle layer 23 is properly about 0.5 µm to 10 µm, preferably about 2 µm to 3 µm.

In the embodiment as shown in FIG. 2, the film 21 is the above-mentioned polyamide-based film or polyester-based film; on the other hand, the middle layer 23 may suitably employ two-part type curable adhesive containing a copolymer of polyol as a main agent and diisocyanate as a curing agent. In addition, the adhesive for the adhesive layer 22 may be the above-mentioned adhesive. In particular, the middle layer is suitably used in an embodiment in which the film and adhesive layer of different materials are stuck with each other. Further, in an embodiment in which the film and adhesive layer of the same materials are attached with each other, higher performance may be exhibited in view of the peel strength and washing resistance, so that it is preferable.

In addition, the reinforcing tape provided by the present invention is used for reinforcing the ends of slide fasteners, that in the case of being stacked on both surfaces of a fastener tape, the overall thickness of the reinforcing tape is preferably 100 µm to 200 µm, more preferably 140 µm to 180 µm; and, while on a single surface of the fastener tape, the overall thickness of the reinforcing tape is preferably 200 µm to 400 µm, more preferably 280 µm to 360 µm.

Therefore, for reinforcing the ends of a fastener tape, it is also possible to stack the reinforcing layer formed from the film optionally laminated with the middle layer after applying the adhesive layer to the surfaces of the ends of the fastener and then perform heating compression. It is also preferable that a reinforcing tape is prepared beforehand in a manner that the middle layer and the adhesive layer by the conventionally known lamination methods such as dry lamination and coextrusion on one side of the surface of the film in order not to allow air between the adhesive layer and the reinforcing layer during the adhesion process, and then the resulting reinforcing tape is heated and compressed on the end surface of the fastener tape on contact with the adhesive layer. In heating for the heating compression, a heating plate, ultrasonic waves, high frequency or other heating methods may be used.

Figure 3:
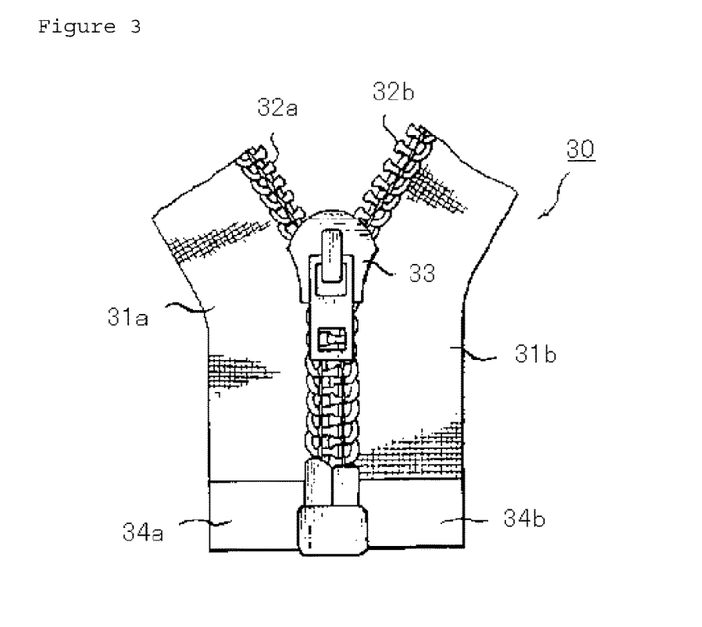
FIG. 3 is a partial top view showing a lower portion of slide fasteners adhered with the reinforcing tape of the present invention.
Figure 4:
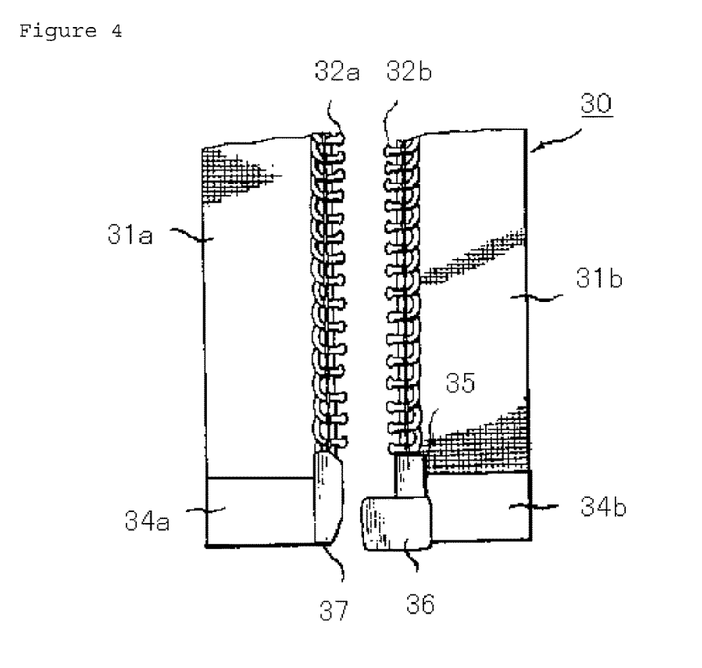
FIG. 4 is a partial top view showing a lower portion of the slide fasteners of FIG. 3 in a separate state.

FIG. 3 and FIG. 4 each shows a lower portion of an embodiment of slide fastener 30, where attaching portions of separable fittings at lower portions of a pair of fastener tapes 31a, 31b are attached with reinforcing tapes 34a, 34b provided by the present invention.

The slide fasteners 30 shown in FIG. 3 includes: a pair of fastener tapes 31a, 31b; a pair of reinforcing tapes 34a, 34b separately spliced to a lower portion of each of the fastener tapes 31a, 31b; zip teeth rows 32a, 32b such as coil elements attached on the inside edges of the fastener tapes; a slider 33; and, an insertion rod 37, a box rod 35 and a box body 36 which form a separable fitting attached on inside edges of the reinforcing tapes 34a, 34b spliced to the lower portions of the fastener tapes 31a, 31b. In order to make the zip teeth rows 32a, 32b engaged with or disengaged from each other, the slider 33 is slidingly attached on the zip teeth rows. FIG. 3 shows a closed state of the slide fasteners 30, while FIG. 4 shows an opened state.

Each lower end portion of the pair of fastener tapes 31a, 31b knitted or woven by fiber material containing synthetic fibers such as polyester and nylon or natural fibers such as cotton are spliced with reinforcing tapes 34a, 34b, respectively. The insertion rod 37 which is an attaching metal piece of the separable fitting is attached on an inside edge of one of those reinforcing tape, facing each other, the reinforcing tape 34a, while the box body 36 and the box rod 35 for allowing the insertion rod 37 to be inserted are attached on the inside edges of the other reinforcing tape 34b opposing to that of the reinforcing tape 34a. The insertion rod 37 may be detachably snapped in an insertion groove of the box body 36. In addition, the box body 36 and the box rod 35 are an integrated single piece.

As described above, the end portions of the fastener tapes 31a, 31b are reinforced by adhering, at high adhesion strength, the transparent or translucent reinforcing tapes 34a, 34b with excellent flexibility provided by the present invention, through which the color of the slide fastener tapes 31a, 31b may be seen. The reinforcing tapes 34a, 34b are approximately transparent as a whole, so that the color of the fastener tapes 31a, 31b may be directly seen. As the color of the reinforcing tapes is nearly the same as the color of the dyed fastener tapes, the appearance will not be damaged. In addition, the following advantage may be achieved: a single type of reinforcing tape may be applied to various colors of fastener tapes, so that it is not required to prepare reinforcing tapes corresponding to each color, and then complicated stock management is not required. Furthermore, to reduce the surface glossiness and increase flexibility of the reinforcing tapes, the reinforcing layers on the surfaces of the reinforcing tapes may be knurled after or during the heating compression.

As an index of the peel strength and washing resistance in the present invention, the peel degree is obtained by the following crease-flex test.

Figure 5:
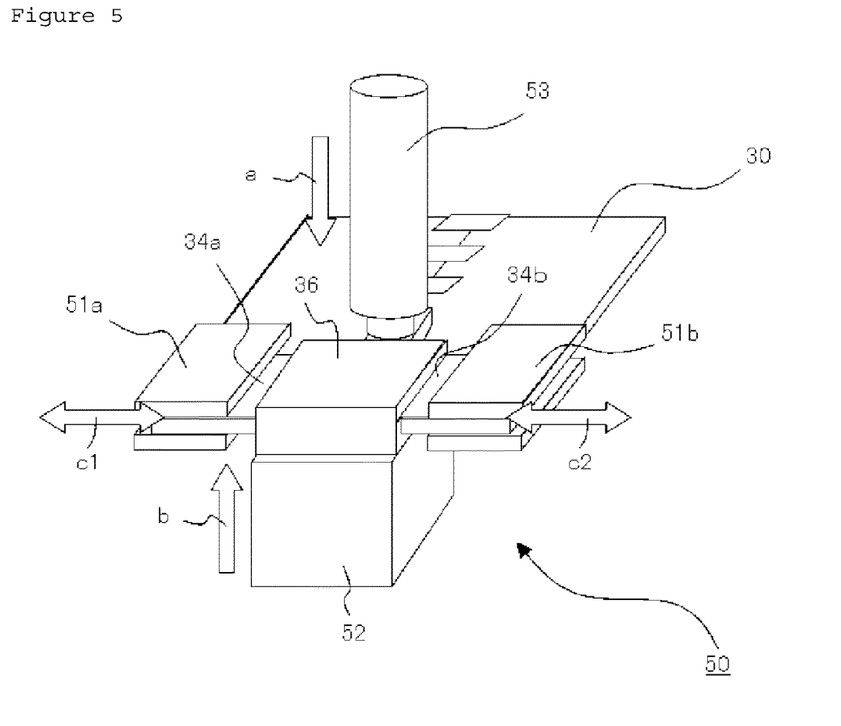
FIG. 5 is a diagram schematically showing a main portion of a testing machine used in a flexing test for assessing the reinforcing tape according to the present invention.

FIG. 5 is a diagram schematically showing a main portion of a testing machine used in a crease-flex tester.

For the crease-flex tester 50, the main portion is composed of the following parts: clamping portions 51a, 51b used for clamping the slide fastener 30 at the reinforcing tapes 34a, 34b of the slide fastener 30; a support portion 52 for supporting the box body 36 of the slide fastener in a state of elastically applying force from the underneath of the slide fastener towards direction b; and, a press portion 53 for pressing the insertion rod and the box rod of the slide fastener from the above of the slide fastener towards direction a. In addition, by a press action of the direction a of the press portion 53 and an elastic applied force of the direction b of the support portion 52, the slide fastener is moved between direction a and direction b, and the clamping portions 51a, 51b are moved back and forth towards horizontal direction c1 and direction c2, respectively.

If it is assumed that common washing is performed, the slide fastener moves to direction a, direction b, direction c1 and direction c2 in the warm water for specified times. Thus, the peeling of the reinforcing tapes 34a, 34b from the slide fastener is detected as white turbidity. Therefore, the degree of white turbidity is scanned by a particular image sensor and then expressed as a numerical value, and a ratio of the change in state with relative to the control before the crease-flex test is defined as a peel degree. In other words, it is estimated that the more the turbidity is, the higher the peel degree is, the worse the washing resistance is, and the lower the peel strength is.

EXAMPLES

The present invention will be more specifically described below by examples, comparative examples and test examples with identified effects of the present invention. Of course, the present invention is not limited to the following examples.

Preparation Example 1

Two-part type curable adhesive containing a copolymer of polyol as a main agent and diisocyanate as a curing agent was coated on a rear face of a nylon-based elastomer film (produced by Arkema Co. Ltd., 7233FP01) having a thickness of 100 μm in a manner of forming a thickness of 2μm to 3μm. Then, a polyester-based hot-melt adhesive layer (produced by TOYOBO Co. Ltd., Vylon GM900, of a melting point of 112° C., a melt viscosity of 1500 poise measured at 200° C. and at a load of 10 kgf by a flow tester) having a thickness of 60 μm was laminated to form a reinforcing tape. The overall thickness of the reinforcing tape (stacked on both faces of a fastener tape) was 160 μm.

Preparation Example 2

In the preparation example 1, a reinforcing tape was manufactured similarly in preparation example 1, except that the thickness of the nylon-based elastomer film was set as 60 μm, and the thickness of the adhesive layer was set as 100 μm. The overall thickness of the reinforcing tape (stacked on both faces of a fastener tape) was 160 μm.

Preparation Example 3

In the preparation example 1, a reinforcing tape was manufactured similarly in preparation example 1, except that Vylon GM900 (produced by TOYOBO Co. Ltd.) in the adhesive layer was replaced with Vylon GM400 (produced by TOYOBO Co. Ltd., of a melting point of 143° C., a melt viscosity of 4600 poise measured at 200° C. and at a load of 10 kgf by a flow tester). The overall thickness of the reinforcing tape (stacked on both faces of a fastener tape) was 160 μm.

Preparation Example 4

In the preparation example 3, a reinforcing tape was manufactured similarly in preparation example 3, except that the thickness of the nylon-based elastomer film was set as 60 μm, and the thickness of the adhesive layer was set as 100 μm. The overall thickness of the reinforcing tape (stacked on both faces of a fastener tape) was 160 μm.

Preparation Example 5

In the test example 3, a reinforcing tape was manufactured similarly in preparation example 3, except that the thickness of the nylon-based elastomer film was set as 80μm, and the thickness of the adhesive layer was set as 80μm. The overall thickness of the reinforcing tape (stacked on both faces of a fastener tape) was 160 μm.

Preparation Example 6

In the preparation example 1, a reinforcing tape was manufactured similarly in preparation example 1, except that Vylon GM900 (produced by TOYOBO Co. Ltd. in the adhesive layer was replaced with high-molecular-weight saturated polyester resin POLYESTER SP176 (produced by Japanese Synthetic Chemical Industry Corporation, of a melting point of 130° C., a melt viscosity of 5600 poise measured at 190° C. and at a load of 30 kgf by a flow tester). The overall thickness of the reinforcing tape (stacked on both faces of a fastener tape) was 160 μm.

Preparation Example 7

In the preparation example 6, a reinforcing tape was manufactured similarly in preparation example 6, except that the thickness of the nylon-based elastomer film was set as 60 μm, and the thickness of the adhesive layer was set as 100 μm. The overall thickness of the reinforcing tape (stacked on both faces of a fastener tape) was 160 μm.

Preparation Example 8

In the preparation example 1, a reinforcing tape was manufactured similarly in preparation example 1, except that Vylon GM900 (produced by TOYOBO Co. Ltd.) in the adhesive layer was replaced with Vylon GA3200 (produced by TOYOBO Co. Ltd., of a melting point of 123° C., a melt viscosity of 140 poise measured at 200° C. and at a load of 10 kgf by a flow tester). The overall thickness of the reinforcing tape (stacked on both faces of a fastener tape) was 160 μm.

Preparation Example 9

In the preparation example 8, a reinforcing tape was manufactured similarly in preparation example 8, except that the thickness of the nylon-based elastomer film was set as 60 μm, and the thickness of the adhesive layer was set as 100 μm. The overall thickness of the reinforcing tape (stacked on both faces of a fastener tape) was 160 μm.

Test Example

On the surfaces and rear faces of the slide fastener chains in a zip teeth (elements) engaged state, respectively, were layered the reinforcing tape manufactured in each of example, along a horizontal direction in a manner of contacting with an adhesive layer and in a manner of crossing the zip teeth rows, and ultrasonic adhesion was performed under pressurization, so that five samples were manufactured with respect to each preparation example.

Then, the crease-flex test was performed after adhesion, and the generation of white turbidity was evaluated so as to obtain the peel degree. The peel degree of the reinforcing tape of each preparation example was obtained by averaging the results on the insertion side, and the box side as well as the five samples. The results are as shown in Table 1.

TABLE 1

| | Preparation example | | | | | | | | |
|---|---|---|---|---|---|---|---|---|---|
| | 1 | 2 | 3 | 4 | 5 | 6 | 7 | 8 | 9 |
| Adhesive | GM900 | | | GM400 | | SP176 | | GA3200 | |
| Film thickness (μm) Elastomer/adhesive layer | 100/60 | 60/100 | 100/60 | 60/100 | 80/80 | 100/60 | 60/100 | 100/60 | 60/100 |
| Average of peel degree | 92.14 | 72.97 | 18.92 | 5.51 | 2.34 | 95.29 | 84.61 | 97.33 | 90.79 |

As can be seen from Table 1, in any of adhesive, when the thickness of the adhesive layer is greater than that of the elastomer film, the peel degree becomes smaller. Further, the results of the crease-flex test show that the portion of the reinforcing tape to be peeled off, to exhibit white turbidity should be little, so that it is recognized that the washing resistance is excellent, and the peel strength is high. When the elastomer/adhesive layer in the film is 80 μm/80 μm, the peel degree becomes smaller, that is, the peel strength becomes higher, there was no white turbidity observed, but the fastener tapes was dissolved, so that the fastener tapes had no value as a product. Therefore, it can be seen that it is desirable to make the adhesive layer thicker than the elastomer in order to make the fastener tapes to be not dissolved and realize a resistance to high temperature.

REFERENCE NUMBERS

10: Reinforcing tape
11: film
12: Adhesive layer
20: Reinforcing tape
21: film
22: Adhesive layer
23: Middle layer
30: Slide fasteners
31a, 31b: Fastener tapes
32a, 32b: Zip teeth
33: Slider
34a, 34b: Reinforcing tapes
35: Box rod
36: Box body
37: Insertion rod

What is claimed:

1. A reinforcing tape for slide fasteners, which is formed by stacking an adhesive layer on a rear face of a transparent film, wherein the adhesive layer is polyester-based hot-melt adhesive, polyamide-based hot-melt adhesive, polyolefin-based hot-melt adhesive or polyurethane-based holt-melt adhesive, with a melting point of above 120° C. but 160° C. or less and a melt viscosity at 200° C. of above 2000 poise but 5500 poise or less, and wherein a thickness of the transparent film and a thickness of the adhesive layer satisfies the following relationship:

$$1 < \text{(thickness of the adhesive layer)}/\text{(thickness of the film)} \leq 2,$$

wherein the thickness of the transparent film is in a range of 30 μm to 120 μm, and the thickness of the adhesive layer is in a range of 50 μm to 200 μm, wherein the transparent film includes a polyamide-based film, a polyester-based film, a polyolefin-based film, or a polyurethane-based film.

2. The reinforcing tape for slide fasteners according to claim 1, further provided with a middle layer located between the film and the adhesive layer and comprising an anchor coating agent.

3. The reinforcing tape for slide fasteners according to claim 2, wherein the middle layer is two-part curable adhesive.

4. The reinforcing tape for slide fasteners according to claim 1, wherein the melting point of the adhesive is 130° C. or greater but 150° C. or less, and the melt viscosity at 200° C. is 3000 poise or greater but 5000 poise or less.

5. The reinforcing tape for slide fasteners according to claim 2, wherein the thickness of the middle layer is 0.5 μm to 10 μm.

6. The reinforcing tape for slide fasteners according to claim 1, wherein the reinforcing tape is configured to stack on a single or both sides of a fastener tape, and the thickness of the reinforcing tape is 100 μm to 400 μm.

7. A reinforcing tape for slide fasteners, which is formed by stacking an adhesive layer on a rear surface of a transparent film, wherein the adhesive layer is polyester-based hot-melt adhesive, polyamide-based hot-melt adhesive, polyolefin-based hot-melt adhesive or polyurethane-based holt-melt adhesive, with a melting point of above 120° C. but 160° C. or less, and the thickness of the film and the thickness of the adhesive layer satisfy the following relationship:

1<(thickness of the adhesive layer)/(thickness of the film)≤2, wherein the thickness of the transparent film is in a range of 30 μm to 120 82 m, and the thickness of the adhesive layer is in a range of 50 μm to 200 μm, wherein the transparent film includes a polyamide-based film, a polyester-based film, a polyolefin-based film, or a polyurethane-based film.

8. The reinforcing tape for slide fasteners according to claim 7, wherein a melt viscosity of the adhesive at 200° C. is above 2000 poise but 5500 poise or less.

9. The reinforcing tape for slide fasteners according to claim 7, wherein the reinforcing tape is further provided with a middle layer comprising an anchor coating agent, which is located between the film and the adhesive layer.

10. The reinforcing tape for slide fasteners according to claim 9, wherein the middle layer is two-part curable adhesive.

11. The reinforcing tape for slide fasteners according to claim 7, wherein the melting point of the adhesive is 130° C. or greater but 150° C. or less, and the melt viscosity at 200° C. is 3000 poise or greater but 5000 poise or less.

12. The reinforcing tape for slide fasteners according to claim 9, wherein the thickness of the middle layer is 0.5 μm to 10 μm.

13. The reinforcing tape for slide fasteners according to claim 7, wherein the reinforcing tape is configured to stack on a single or both sides of a fastener tape, and the thickness of the reinforcing tape is 100 μm to 400 μm.

* * * * *

UNITED STATES PATENT AND TRADEMARK OFFICE
CERTIFICATE OF CORRECTION

PATENT NO. : 10,099,448 B2
APPLICATION NO. : 14/899156
DATED : October 16, 2018
INVENTOR(S) : Takayuki Ogyu et al.

It is certified that error appears in the above-identified patent and that said Letters Patent is hereby corrected as shown below:

In the Specification

In Column 2, Line 65, delete "holt-melt" and insert -- hot-melt --, therefor.

In Column 3, Line 38, delete "holt-melt" and insert -- hot-melt --, therefor.

In Column 4, Line 43, delete "holt-melt" and insert -- hot-melt --, therefor.

In Column 5, Lines 19-28, delete "Furthermore, if the adhesive layer or middle layer of the reinforcing tape has a thickness less than that of the film as the reinforcing layer and a low stiffness, the flexural modulus of the whole reinforcing tape greatly depends on the flexural modulus of the film itself but are affected by the type and thickness of the adhesive layer and the like. c1
Therefore, it is preferable to select the type and thickness of the adhesive layer in a manner that the flexural modulus of the whole reinforcing tape also falls within the above range." and insert the same on Column 5, Line 18 as a continuation of the same paragraph.

In Column 5, Line 24, delete "like. c1" and insert -- like. --, therefor.

In Column 8, Line 3, delete "2μm" and insert -- 2 μm --, therefor.

In Column 8, Line 4, delete "3μm." and insert -- 3 μm. --, therefor.

In Column 8, Line 46, delete "80μm," and insert -- 80 μm, --, therefor.

In Column 8, Line 47, delete "80μm." and insert -- 80 μm. --, therefor.

In the Claims

In Column 10, Line 27, in Claim 1, delete "holt-melt" and insert -- hot-melt --, therefor.

Signed and Sealed this
Fourth Day of December, 2018

Andrei Iancu
*Director of the United States Patent and Trademark Office*

In Column 11, Line 12, in Claim 7, delete "holt-melt" and insert -- hot-melt --, therefor.

In Column 11, Line 20, in Claim 7, delete "82 m," and insert -- μm, --, therefor.